US011411899B2

(12) United States Patent
Tevonian et al.

(10) Patent No.: US 11,411,899 B2
(45) Date of Patent: Aug. 9, 2022

(54) ROUTING PARENT AND CHILD DEVICE CALLS THROUGH A PARENT TELEPHONY APPLICATION SERVER

(71) Applicant: Alcatel-Lucent USA Inc., Murray Hill, NJ (US)

(72) Inventors: Gregory B. Tevonian, North Aurora, IL (US); Simon Ou, Naperville, IL (US); Jessica C. Thelen, Naperville, IL (US)

(73) Assignee: Nokia of America Corporation, Murray Hill, NJ (US)

( * ) Notice: Subject to any disclaimer, the term of this patent is extended or adjusted under 35 U.S.C. 154(b) by 247 days.

(21) Appl. No.: 15/259,982

(22) Filed: Sep. 8, 2016

(65) Prior Publication Data

US 2018/0069813 A1 Mar. 8, 2018

(51) Int. Cl.
*H04L 51/046* (2022.01)
*H04L 65/1016* (2022.01)
(Continued)

(52) U.S. Cl.
CPC ............ *H04L 51/046* (2013.01); *H04L 51/24* (2013.01); *H04L 65/1006* (2013.01);
(Continued)

(58) Field of Classification Search
CPC ....... H04L 51/046; H04L 67/10; H04L 67/26; H04L 51/24; H04L 67/1061;
(Continued)

(56) References Cited

U.S. PATENT DOCUMENTS

| 7,555,112 B2 * | 6/2009 | Clark | H04L 12/66 379/220.01 |
| 2005/0135374 A1 * | 6/2005 | Isomaki | H04M 7/006 370/395.2 |

(Continued)

FOREIGN PATENT DOCUMENTS

| CN | 101009609 A | 8/2007 |
| CN | 101102615 A | 1/2008 |

(Continued)

OTHER PUBLICATIONS

International Search Report dated Nov. 8, 2017 for PCT Application No. PCT/US2017/050011, 3 pages.
(Continued)

*Primary Examiner* — Hassan Kizou
*Assistant Examiner* — Hector Reyes
(74) *Attorney, Agent, or Firm* — Tong, Rea, Bentley & Kim, LLC

(57) ABSTRACT

A first invite message including a parent device identifier assigned to a parent device is received. The first invite message refers to an incoming call or an outgoing call. The incoming call or the outgoing call are then routed between a parent telephony application server (TAS) allocated to the parent device and a child TAS allocated to a child device. In some cases, the child device is a mobile child device that is registered with an Internet Protocol (IP) multimedia subsystem (IMS) network using a unique identifier that is associated with a child device identifier assigned to the mobile child device. The parent TAS is able to store the child device identifier and the child TAS is able to store the parent device identifier.

22 Claims, 12 Drawing Sheets

(51) Int. Cl.
*H04L 65/10* (2022.01)
*H04L 67/1061* (2022.01)
*H04L 65/1073* (2022.01)
*H04L 51/224* (2022.01)
*H04L 67/55* (2022.01)
*H04W 8/26* (2009.01)
*H04L 67/10* (2022.01)
*H04L 65/1063* (2022.01)
*H04L 65/1069* (2022.01)

(52) U.S. Cl.
CPC ...... *H04L 65/1016* (2013.01); *H04L 65/1063* (2013.01); *H04L 65/1069* (2013.01); *H04L 65/1073* (2013.01); *H04L 67/10* (2013.01); *H04L 67/1061* (2013.01); *H04L 67/26* (2013.01); *H04W 8/26* (2013.01)

(58) Field of Classification Search
CPC ............. H04L 65/1006; H04L 65/1016; H04L 65/1073; H04W 8/26
See application file for complete search history.

(56) References Cited

U.S. PATENT DOCUMENTS

| | | | | |
|---|---|---|---|---|
| 2008/0259909 | A1* | 10/2008 | Runeson | H04L 65/1006 370/352 |
| 2010/0290403 | A1* | 11/2010 | Lindholm | H04W 8/06 370/328 |
| 2012/0166652 | A1* | 6/2012 | Bouthemy | H04L 65/1083 709/227 |
| 2014/0068710 | A1* | 3/2014 | Lau | H04L 12/66 726/3 |
| 2015/0172333 | A1* | 6/2015 | Lindstrom | H04L 65/1016 370/261 |
| 2016/0156783 | A1 | 6/2016 | Mufti et al. | |
| 2016/0269496 | A1* | 9/2016 | Lidin | H04M 3/42263 |
| 2016/0330320 | A1* | 11/2016 | Ghuli | H04M 3/02 |
| 2016/0337825 | A1* | 11/2016 | Piscopo, Jr. | H04W 4/16 |
| 2017/0339740 | A1* | 11/2017 | Abichandani | H04L 41/026 |
| 2017/0353503 | A1* | 12/2017 | Trabelsi | H04W 76/10 |
| 2018/0375901 | A1* | 12/2018 | Doree | H04L 65/1016 |

FOREIGN PATENT DOCUMENTS

| | | |
|---|---|---|
| CN | 101267474 A | 9/2008 |
| CN | 101677346 A | 3/2010 |
| CN | 101753730 A | 6/2010 |

OTHER PUBLICATIONS

International Preliminary Report on Patentability dated Mar. 12, 2019 for PCT Application No. PCT/US2017/050011, 8 pages.

Chinese Office Action mailed in corresponding CN Application No. 2017800551684 dated Aug. 4, 2021, 6 pages.

Chinese Office Action mailed in corresponding CN Application No. 201780055168.4 dated Feb. 9, 2022, 6 pages.

* cited by examiner

ROUTING PARENT AND CHILD DEVICE CALLS THROUGH A PARENT TELEPHONY APPLICATION SERVER

BACKGROUND

Field of the Disclosure

The present disclosure relates generally to wireless communication systems and, more particularly, to routing calls in wireless communication systems.

Description of the Related Art

User equipment register with an Internet Protocol (IP) Multimedia Subsystem (IMS) network in order to communicate with other user equipment. A home subscriber server (HSS) stores subscriber information for the user equipment in a database. The subscriber information includes information such as a phone number or other device identifier such as an IP multimedia public identity (IMPU) for the user equipment, an IP multimedia private identity (IMPI) that is allocated by a network operator, and subscription information that is used, for example, for registration, authorization, administration, or billing. A telephony application server (TAS) is allocated to the user equipment and used to provide calling services for the user equipment such as outgoing call barring, incoming call blocking, prepaid billing verification, call forwarding, simultaneous ringing, simultaneous call limit restrictions, and the like. The calling services for the user equipment can be identified in the subscription information stored in the HSS. Individual subscribers typically own and operate multiple different user equipment such as smart phones, tablets, smart watches, and the like. Each user equipment can register with the IMS network using a separate phone number so that the different user equipment are able to place and receive telephone calls using their corresponding phone numbers. Each user equipment is also allocated a separate TAS to provide calling services for the user equipment.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

DETAILED DESCRIPTION

Figure 1:
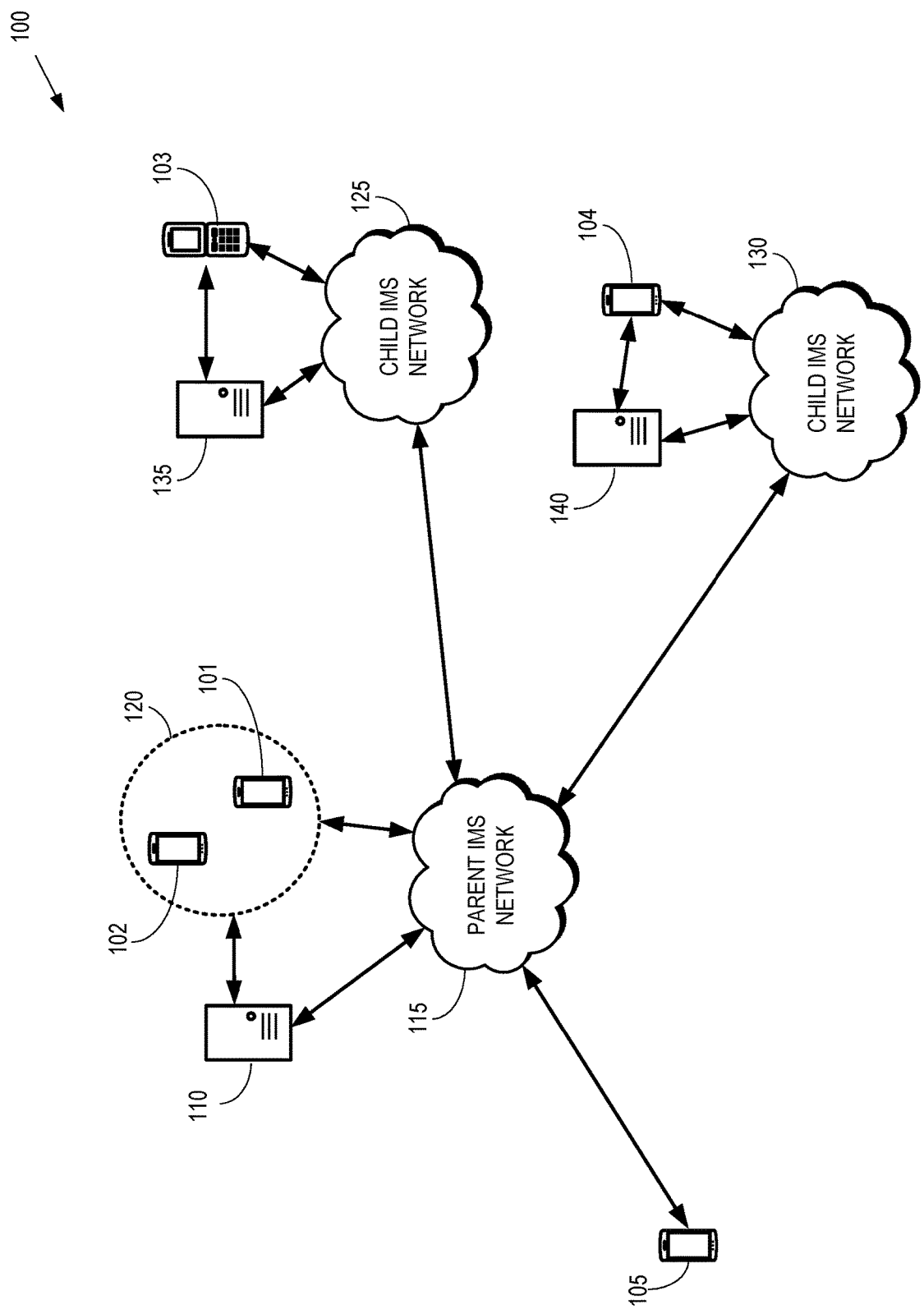
FIG. 1 is a diagram of a wireless communication system according to some embodiments.

Subscribers can receive incoming calls at multiple user equipment using a "simultaneous ringing" feature that identifies one of the user equipment as a "parent" device and the other user equipment as "child" devices. The child devices can include non-mobile child devices that register with the IMS network using the identity of the parent device and mobile child devices that register with the IMS network using their own unique identifiers that support independent connections to the IMS network or using other access networks. Phone numbers can be used to direct calls to parent or child devices. Although the term "phone number" is used herein to indicate device identifiers of the parent and child devices, other device identifiers can be used to identify the parent or child devices in some embodiments. Examples of device identifiers include strings of numbers, character strings, combinations of numbers and characters, or other identifiers such as an IP multimedia public identity (IMPU), an email address, and the like. When simultaneous ringing is invoked, incoming calls to the parent phone number (or other device identifier) are directed to the parent TAS, which sends parallel invite messages to the parent device and the child devices. The incoming call can then be answered at any of the devices. However, calls that are placed by the child devices are routed through the individual child TASs. Consequently, the parent device and the child devices do not necessarily receive the same calling services because the calling services are provided to the different devices by different TASs. Furthermore, calls that are initially established by the parent device cannot be moved seamlessly from the parent device to one of the child devices without putting the call on hold (a process that is referred to herein as "pulling" the call from the parent device to the child device), nor can calls that are initially established by a child device be pulled to the parent device or another child device.

Session initiation protocol (SIP) forking techniques allow calls to be placed or received by a set of user equipment using the same phone number (or other device identifier), and calls can be moved between devices in the set, if the set includes a parent device and only non-mobile child devices that register with the IMS network using a public identity that is common to the parent device and the non-mobile child devices. However, SIP forking techniques cannot be applied to sets of user equipment that include mobile child devices that register with the IMS network using individual identities that are different than the common identity used by the parent and the non-mobile child devices.

A set of user equipment that includes a parent device and one or more child devices can place or receive calls on the basis of a parent phone number by routing incoming and outgoing calls associated with a child device between a parent TAS allocated to the parent device and a child TAS allocated to the child device. To support routing between the parent and child TASs, the parent TAS is configured with information indicating the child phone numbers and the child TASs are configured with information indicating the parent phone number. The child devices include one or more mobile child devices and (optionally) one or more non-mobile child devices. When an incoming call to the parent phone number arrives at the parent TAS, the parent TAS sends concurrent invite messages to the parent device and each of the child TASs, which then forward the invite messages to the corresponding child devices. Any of the devices receiving the invite message can answer the call, at which point the other devices are notified that the call has been answered. When an outgoing call is placed by a child device, the child TAS transmits an invite message to the parent TAS using the parent phone number. The parent TAS is therefore able to apply call services to calls placed by any of the child devices.

A first device (either a parent device or a child device) can pull an established call from a second device by transmitting an invite message to the parent TAS, which initiates the call pull by transmitting a re-invite message that identifies the first device to a third device that is connected to the established call. If the third device accepts the re-invitation, the third device is connected to the second device and the first device is released. The parent TAS can also notify other devices to inform them that the call has been pulled from the second device to the first device. Established calls can be pushed from the first device to the third device in response to the first device transmitting a refer message to the parent TAS. The parent TAS transmits a message to the third device indicating that the first device is requesting to push the call to the third device. After the third device accepts the push request, the parent TAS sends a re-invite message to the second device. Pushing of the call then proceeds in a manner similar to pulling a call in response to receiving confirmation that the second and third devices accept the request to push the call.

FIG. 1 is a diagram of a wireless communication system 100 according to some embodiments. The wireless communication system 100 includes user equipment 101, 102, 103, 104, 105 that are collectively referred to herein as "the user equipment 101-105." A subset of the user equipment 101-104 is owned or operated by a single subscriber. For example, the subscriber can have a multi-device subscription with a service provider that allows the subscriber to use any of the user equipment 101-104 to place or receive calls. One of the user equipment 101 is designated as a parent device 101 that is registered with a parent telephony application server (TAS) 110. The parent device 101 is assigned a parent phone number that is stored by the parent TAS 110 and used to identify the parent device 101 in calls placed or received by the parent device 101. The parent TAS 110 is also configured to provide calling services for the parent device 101 such as outgoing call barring, incoming call blocking, prepaid billing verification, call forwarding, simultaneous ringing, simultaneous call limit restrictions, and the like.

The parent device 101 is also registered with an IP Multimedia Subsystem (IMS) network 115, which is an IP packet-switched network that is used to support voice, data, or other multimedia services. The IMS network 115 supports the session initiation protocol (SIP), which is an application layer protocol that is used for signaling and control of multimedia communication sessions such as Internet telephony for voice or video calls. Messages are transmitted within the IMS network 115 according to SIP to create, modify, or terminate sessions that include one or more media streams. Examples of messages include REGISTER messages that are used to register a device such as registering the parent device 101 with the IMS network 115, INVITE messages (or RE-INVITE messages) that are used to establish a media session between different users such as the user equipment 101-105, acknowledgment (ACK) messages that are used to confirm receipt of other messages, CANCEL messages that are used to terminate a pending request, BYE messages that are used to terminate an existing session, and the like.

The user equipment 102 is a non-mobile child device 102 that is registered with the parent IMS network 115 using the identity of the parent device 101. For example, the non-mobile child device 102 can register with the parent IMS network 115 using the parent phone number or other identifier of the parent device 101. The non-mobile child device 102 is also registered with the parent TAS 110, which can therefore provide calling services for the child device 102 such as outgoing call barring, incoming call blocking, prepaid billing verification, call forwarding, simultaneous ringing, simultaneous call limit restrictions, and the like. The dashed circle 120 indicates that both the parent device 101 and the non-mobile child device 102 are registered with the parent TAS 110 and the parent IMS network 115 using the identity of the parent device 101. Although a single non-mobile child device 102 is shown in FIG. 1, other variations of the wireless communication system 100 can support any number of non-mobile child devices.

The user equipment 103, 104 are mobile child devices 103, 104 that register with corresponding child IMS networks 125, 130 using unique identifiers that support independent connections to the IMS networks 125, 130. For example, the child devices 103, 104 can be registered with the child IMS networks 125, 130 using corresponding child phone numbers or other identifiers of the child devices 103, 104. The mobile child devices 103, 104 are also registered with corresponding child TASs 135, 140. The child phone numbers are used to identify the mobile child devices 103, 104 for calls placed by the mobile child devices 103 104 and calls that are connected to the mobile child devices 103, 104 via the parent TAS 110, as discussed herein. For example, the child phone number can be used to identify the child devices 103, 104 in INVITE messages or RE-INVITE messages. In some embodiments, the mobile child devices 103, 104 are reachable directly using the child phone numbers, e.g., when the mobile child devices 103, 104 are roaming in 3G networks.

The parent TAS 110 is associated with the child TASs 135, 140, e.g., by storing the child phone numbers of the child devices 103, 104 at the parent TAS 110 and storing the parent phone number of the parent device 101 in one of the child TASs 135, 140. The association between the parent TAS 110 and the child TASs 135, 140 can be formed in response to the mobile child devices 103, 104 sending a SUBSCRIBE message to the corresponding child TASs 135, 140, which then forward the SUBSCRIBE message to the parent TAS 110 to establish the subscription and association.

Once the subscription is established, incoming calls to the parent phone number can be answered by any of the user equipment 101-104 and outgoing calls initiated by any of the user equipment 101-104 are identified by the parent phone number so that outgoing calls appear to have been placed using the parent device 101. For example, the parent IMS network 115 can receive an INVITE message including the parent phone number. The INVITE message can refer to either an incoming call placed by another device (such as the user equipment 105) or an outgoing call to the user equipment 105 that is placed by one of the user equipment 101-104. The call is then routed between the parent TAS 110 and one or more of the child TASs 135, 140. Incoming calls can therefore be answered by any of the user equipment 101-104 and outgoing calls from any of the user equipment 101-104 appear to have been placed by the parent device 101. Routing the incoming or outgoing calls through the parent TAS 110 allows the parent TAS 110 to consistently apply the same call services to all the incoming or outgoing calls, regardless of whether they are placed or received by a parent device 101 or one of the child devices 102, 103. The user equipment 101-104 are also able to pull calls from other devices using messages exchanged with the parent TAS 110, as discussed herein.

Figure 2:
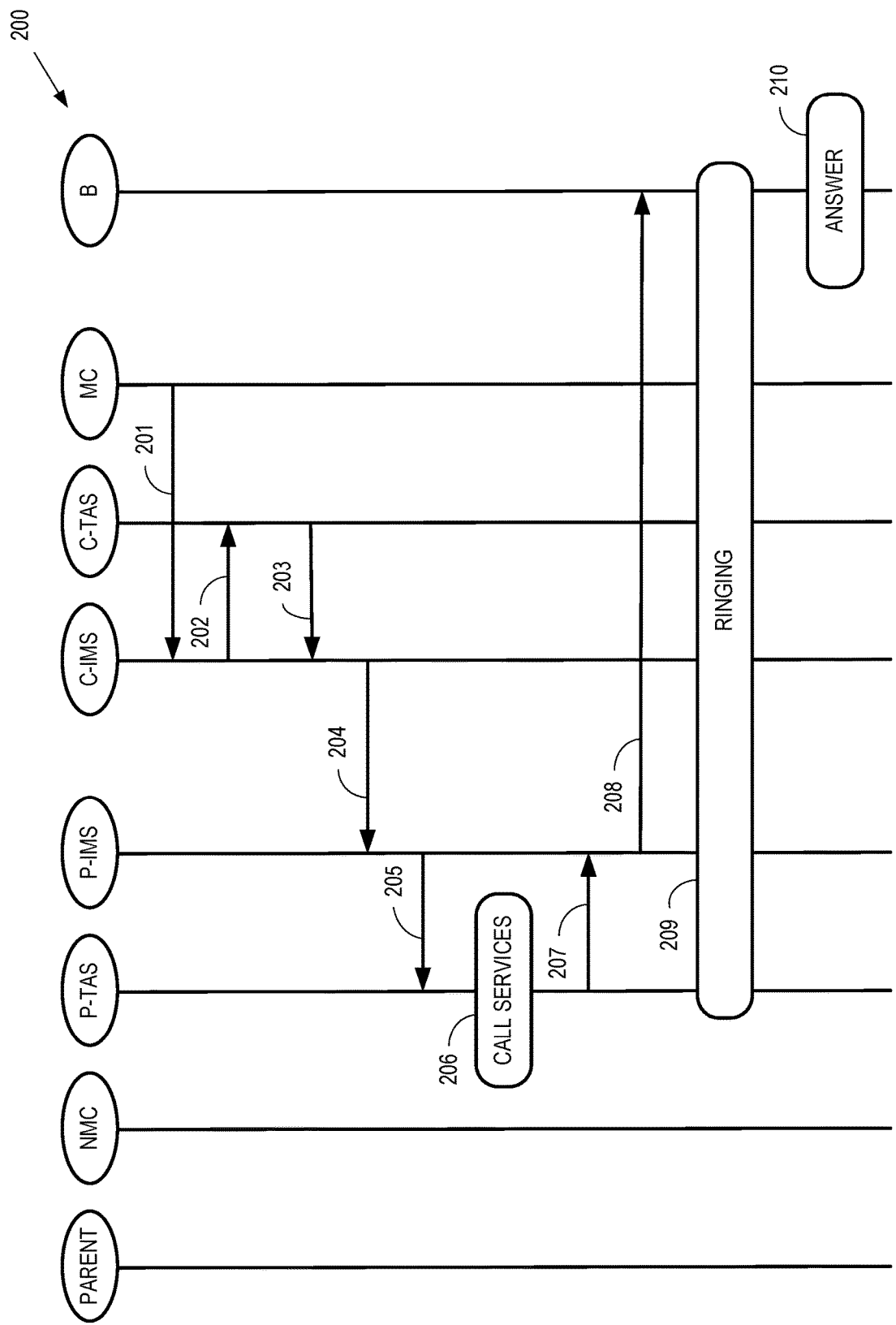
FIG. 2 is a diagram of a first portion of a message flow that illustrates messages exchanged between entities to establish an outgoing call from a mobile child device according to some embodiments.

FIG. 2 is a diagram of a first portion 200 of a message flow that illustrates messages exchanged between entities to establish an outgoing call from a mobile child device according to some embodiments. The first portion 200 of the message flow is implemented in some embodiments of the wireless communication system 100 shown in FIG. 1. Messages can therefore be exchanged between a parent device (PARENT) such as the parent device 101, a non-mobile child device (NMC) such as the non-mobile child device 102, a parent TAS (P-TAS) such as the parent TAS 110, a parent IMS network (P-IMS) such as the parent IMS network 115, a child IMS network (C-IMS) such as the child IMS networks 125, 130, a child TAS (C-TAS) such as the child TASs 135, 140, a mobile child device (MC) such as the mobile child devices 103, 104, and a called party (B) such as the user equipment 105.

The mobile child device transmits a message 201 to the child IMS network to initiate a phone call with the third party device. Some embodiments of the message 201 are an INVITE message that is addressed to the phone number of the third party device and includes the child phone number as the asserted identity of the caller. The child IMS network transmits a message 202 to the child TAS, which is an INVITE message that is addressed to the phone number of the called party and includes the child phone number as the asserted identity of the caller. Subscriber data stored on the child TAS is provisioned with a phone number of the parent device. The child TAS can therefore route the call to the parent TAS via the parent IMS network. The parent TAS can therefore perform call origination services for the outgoing call.

The child TAS transmits a message 203 to the child IMS network to route the call to the parent TAS. Some embodiments of the message 203 are an INVITE message that is addressed to the parent phone number and includes the child phone number as the asserted identity of the caller and the called party phone number as the called number. The child IMS network transmits a message 204 to the parent IMS network. Some embodiments of the message 204 are an INVITE message that is addressed to the parent phone number and includes the child phone number as the asserted identity of the caller and the called party phone number as the called number. The parent IMS network transmits a message 205 to the parent TAS. Some embodiments of the message 205 are an INVITE message that is addressed to the parent phone number and includes the child phone number as the asserted identity of the caller and the called party phone number as the called number.

In response to receiving the message 205, the parent TAS applies call services assigned to the parent phone number at block 206. The call services include originating call services such as call barring, prepaid billing balance verification, simultaneous call restriction checks, and the like. The parent TAS then generates a message 207 inviting the called party to join the call and transmits the message 207 to the parent IMS network. Some embodiments of the message 207 are an INVITE message that is addressed to the called party phone number and includes the parent phone number as the asserted identity of the caller. The parent IMS network transmits a message 208 to the called party. Some embodiments of the message 208 are an INVITE message that is addressed to the called party phone number and includes the parent phone number as the asserted identity of the caller.

In response to the called party receiving the message 208, ringing messages are exchanged between the parent TAS, the parent IMS network, the child IMS network, the child TAS, and the mobile child at block 209. Some embodiments of the ringing messages are 180-ringing messages. The called party answers the call at block 210.

Figure 3:
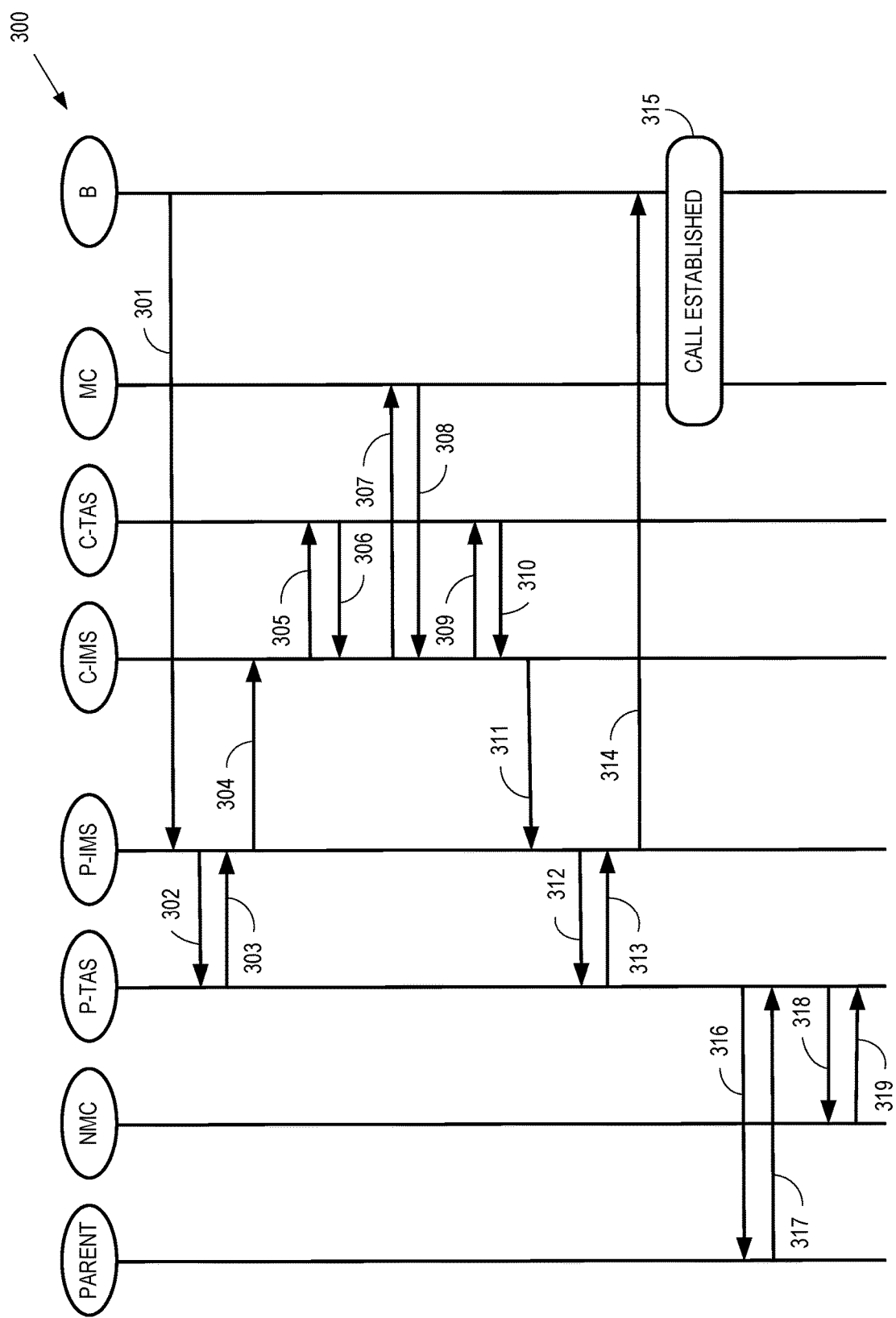
FIG. 3 is a diagram of a second portion of a message flow that illustrates messages exchanged between entities to establish an outgoing call from a mobile child device according to some embodiments.

FIG. 3 is a diagram of a second portion 300 of a message flow that illustrates messages exchanged between entities to establish an outgoing call from a mobile child device according to some embodiments. The second portion 300 of the message flow is implemented in some embodiments of the wireless communication system 100 shown in FIG. 1.

In response to answering the call at block 210 shown in FIG. 2, the called party transmits a message 301 to the parent IMS network to indicate that the called party has answered the call. The parent IMS network transmits a message 302 to the parent TAS, which acknowledges the message 302 by returning a message 303. The parent IMS network also transmits a message 304 to the child IMS network to indicate that the called party has answered the call. The child IMS network transmits a message 305 to the child TAS, which acknowledges the message 305 by returning a message 306. The child TAS then transmits a message 307 to the mobile child to indicate that the called party has answered the call. Some embodiments of the messages 301, 302, 303, 304, 305, 306, 307 are 200-OK INVITE messages.

The mobile child transmits an acknowledgment message 308 to the child IMS network to acknowledge receipt of the message 307 indicating that the called party has answered the call. The child IMS network sends an acknowledgment message 309 to the child TAS, which responds with an acknowledgment message 310. The child IMS network also sends an acknowledgment message 311 to the parent IMS network. In response to receiving the acknowledgment message 311, the parent IMS network transmits an acknowledgment message 312 to the parent TAS, which responds with an acknowledgment message 313. The parent IMS network also transmits an acknowledgment message 314 to the called party. A call between the mobile child and the called party is therefore established at block 315. Even though the call originated from the mobile child device, which is assigned a child phone number that is different than the parent phone number, the call passes through the parent TAS and appears as a call from the parent phone number to the called party.

The parent TAS is also able to notify the parent phone and other child devices such as the non-mobile child device that the mobile child device has initiated and established the call with the called party. For example, the parent TAS sends a message 316 to the parent phone to indicate that the call has been established between the mobile child device and the called party. The parent phone acknowledges receipt of the message 316 by returning a message 317. The parent TAS can also transmit a message 318 to the non-mobile child device to indicate that the call has been established between the mobile child device and the called party. The non-mobile child device acknowledges receipt of the message 318 by returning a message 319. The parent device and the non-mobile child device are therefore able to pull the established call from the mobile child device, as discussed herein. Furthermore, since the parent TAS is aware of the call between the child device and the called party and the call has been routed through the parent TAS, the parent TAS can apply call services such as cancel call waiting logic, call limit restrictions, prepay calling limits, and the like.

Figure 4:
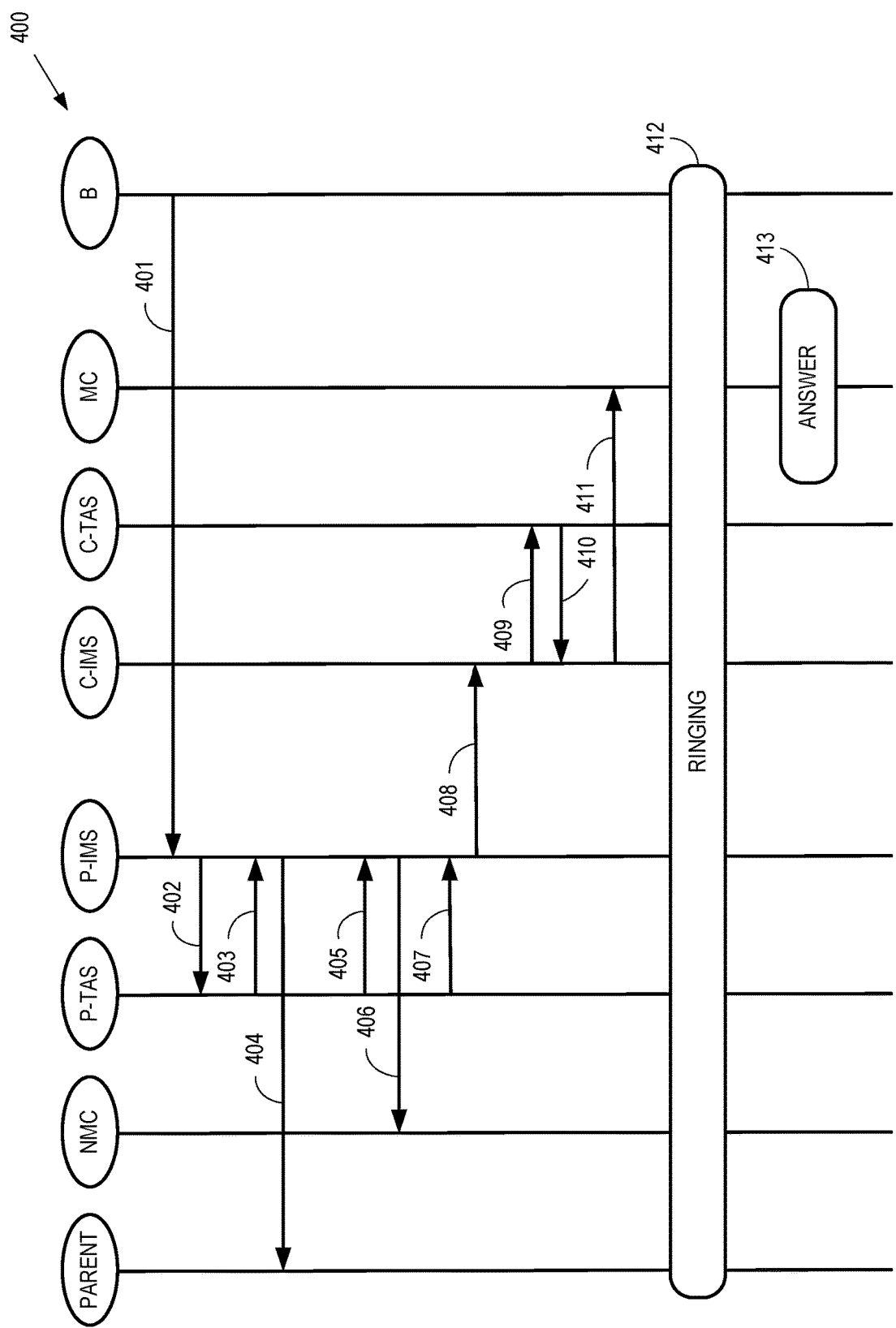
FIG. 4 is a diagram of a first portion of a message flow that illustrates messages exchanged between entities to answer an incoming call at a mobile child device according to some embodiments.

FIG. 4 is a diagram of a first portion 400 of a message flow that illustrates messages exchanged between entities to answer an incoming call at a mobile child device according to some embodiments. The first portion 400 of the message flow is implemented in some embodiments of the wireless communication system 100 shown in FIG. 1. Messages can therefore be exchanged between a parent device (PARENT) such as the parent device 101, a non-mobile child device (NMC) such as the non-mobile child device 102, a parent TAS (P-TAS) such as the parent TAS 110, a parent IMS network (P-IMS) such as the parent IMS network 115, a child IMS network (C-IMS) such as the child IMS networks 125, 130, a child TAS (C-TAS) such as the child TASs 135, 140, a mobile child device (MC) such as the mobile child devices 103, 104, and a calling party (B) such as the user equipment 105.

The calling party initiates the incoming call by transmitting a message 401 to the parent IMS network. In response to receiving the message 401, the parent IMS network transmits a message 402 to the parent TAS. Some embodiments of the messages 401, 402 are INVITE messages addressed to the parent phone number.

The parent phone, the non-mobile child device, and the mobile child device are registered with the parent TAS and so these devices are notified of the incoming call. The parent TAS transmits a message 403 to the parent IMS network, which transmits a message 404 to the parent phone. Some embodiments of the messages 403, 404 are INVITE messages indicating that the call is addressed to the parent number and including an accept contact field that indicates the SIP instance of the parent phone. The parent TAS transmits a message 405 to the parent IMS network, which transmits a message 406 to the non-mobile child device. Some embodiments of the messages 405, 406 are INVITE messages indicating that the call is addressed to the parent number and including an accept contact field that indicates the SIP instance of the non-mobile child device. The parent TAS transmits a message 407 to the parent IMS network, which transmits a message 408 to the child IMS network. In response to receiving the message 408, the child IMS network transmits a message 409 to the child TAS. Some embodiments of the messages 407, 408, 409 are INVITE messages indicating that the call is addressed to the mobile child phone number and including an history information field that indicates the call has been redirected from the parent phone. The history information field also indicates that the call has been received and the called device is serving as a child for the parent device. The child TAS responds to the message 409 by transmitting a message 410 to the child IMS network, which then transmits a message 411 to the mobile child device. Although the messages 403-411 are depicted sequentially in FIG. 4, the messages 403-411 can be transmitted in other orders or concurrently in other variations.

In response to the message exchange including the messages 403-411, ringing messages are exchanged between the parent TAS, the parent IMS network, the child IMS network, the child TAS, and the mobile child at block 412. Some embodiments of the ringing messages are 180-ringing messages. The mobile child device answers the call at block 413.

Figure 5:
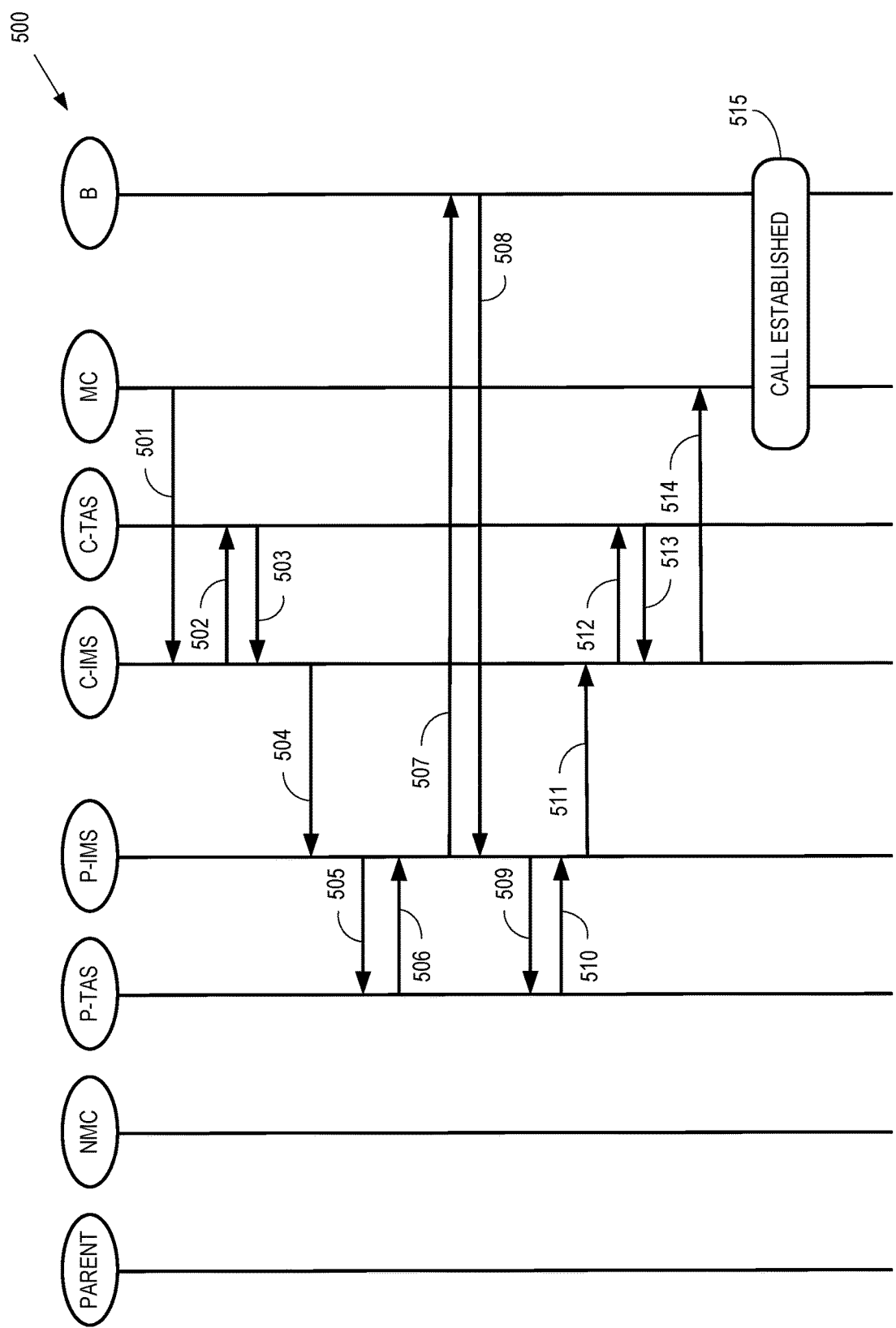
FIG. 5 is a diagram of a second portion of a message flow that illustrates messages exchanged between entities to answer an incoming call at a mobile child device according to some embodiments.

FIG. 5 is a diagram of a second portion 500 of a message flow that illustrates messages exchanged between entities to answer an incoming call at a mobile child device according to some embodiments. The second portion 500 of the message flow is implemented in some embodiments of the wireless communication system 100 shown in FIG. 1.

In response to answering the call at block 413 shown in FIG. 4, the mobile child device transmits a message 501 to the child IMS network, which transmits a message 502 to the child TAS. The child TAS response to the message 502 by transmitting a message 503 to the child IMS network, which then transmits a message 504 to the parent IMS network. In response to receiving the message 504, the parent IMS network transmits a message 505 to the parent TAS, which responds to the message 505 with a message 506 that is transmitted to the parent IMS network. In response to receiving the message 506, the parent IMS network transmits a message 507 to the called party to indicate that the mobile child devices originating a call to the called party. Some embodiments of the messages 501-507 are 200-OK INVITE messages.

The called party responds to the message 507 by transmitting an acknowledgment message 508 to the parent IMS network, which then transmits an acknowledgment message 509 to the parent TAS. In response to receiving the acknowledgment message 509, the parent TAS transmits an acknowledgment message 510 to the parent IMS network, which transmits an acknowledgment message 511 to the child IMS network. In response to receiving the acknowledgment message 511, the child IMS network transmits an acknowledgment message 512 to the child TAS, which responds with an acknowledgment message 513. The child IMS network then transmits an acknowledgment message 514 to the mobile child device. The call is established between the mobile child device and the called party at block 515.

Figure 6:
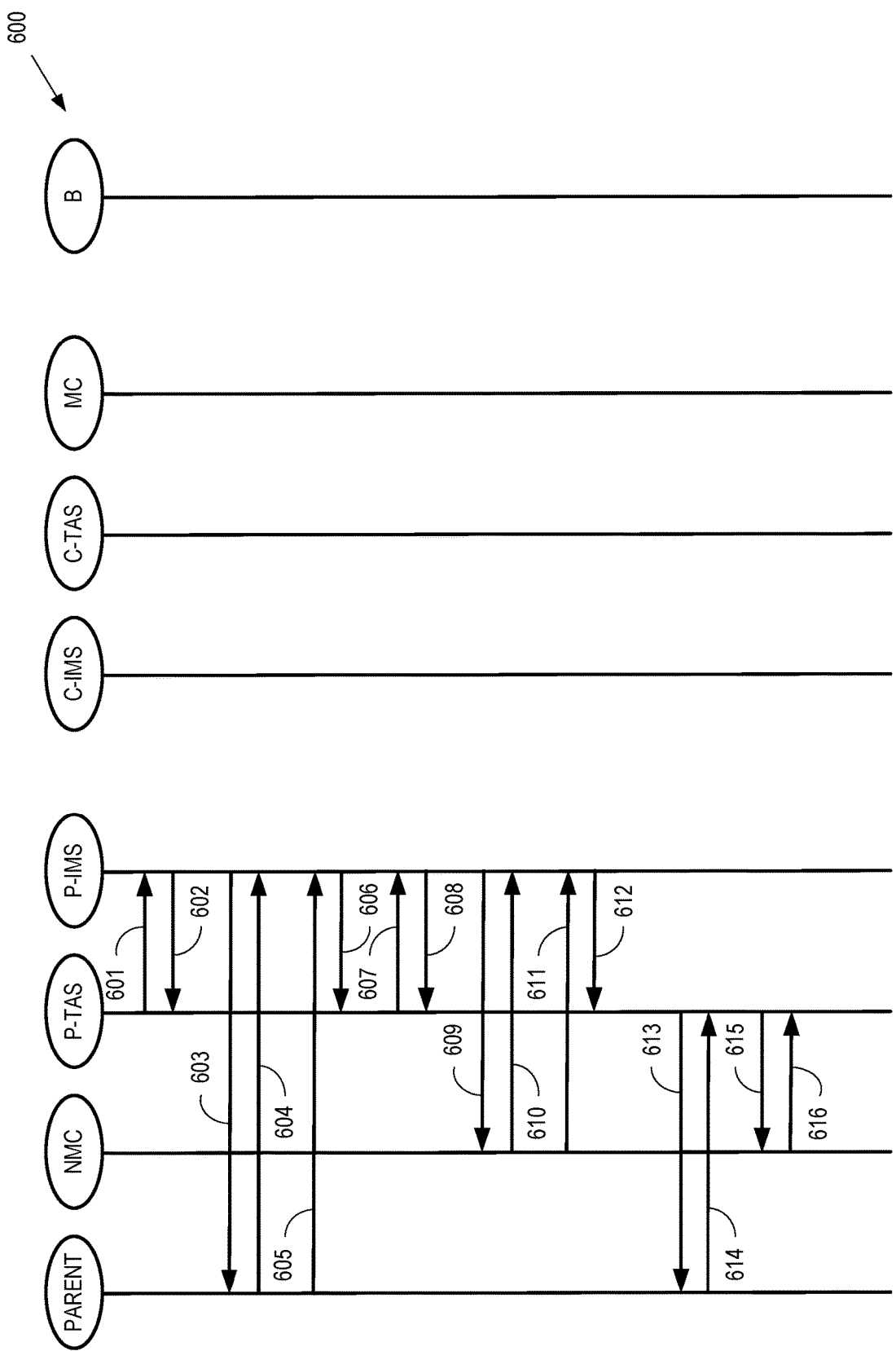
FIG. 6 is a diagram of a third portion of a message flow that illustrates messages exchanged between entities to answer an incoming call at a mobile child device according to some embodiments.

FIG. 6 is a diagram of a third portion 600 of a message flow that illustrates messages exchanged between entities to answer an incoming call at a mobile child device according to some embodiments. The third portion 600 of the message flow is implemented in some embodiments of the wireless communication system 100 shown in FIG. 1.

In response to establishing the call at block 515 shown in FIG. 5, the parent TAS cancels the call request at the parent device by transmitting a message 601 to the parent IMS network. Some embodiments of the message 601 are a CANCEL message that includes information indicating the reason for cancellation is that the call has been completed to another device. In response to receiving the message 601, the parent IMS network responds with a message 602 that acknowledges the cancellation request. The parent IMS network also transmits a message 603 to notify the parent device that the call invitation has been canceled. Some embodiments of the message 603 are a CANCEL message that includes information indicating that the reason for cancellation is that the call has been completed to another device. In response to receiving the message 603, the parent device transmits a message 604 acknowledging the cancellation request. Once the request has been terminated on the parent device, the parent device transmits a message 605 to the parent IMS network indicating that the request has been terminated. The parent IMS network then transmits a message 606 to the parent TAS indicating that the request has been terminated by the parent device.

In response to establishing the call at block 515 shown in FIG. 5, the parent TAS cancels the call to the non-mobile child device by transmitting a message 607 to the parent IMS network. In response to receiving the message 607, the parent IMS network responds with a message 608 that acknowledges the cancellation request. The parent IMS network also transmits a message 609 to notify the non-mobile child device that the call invitation has been canceled. Some embodiments of the message 609 are a CANCEL message that includes information indicating that the reason for cancellation is that the call has been completed to another device. In response to receiving the message 609, the non-mobile child device transmits a message 610 acknowledging the cancellation request. Once the request has been terminated on the non-mobile child device, the non-mobile child device transmits a message 611 to the parent IMS network indicating that the request has been terminated. The parent IMS network then transmits a message 612 to the parent TAS indicating that the request has been terminated by the non-mobile child device. Although the message sequences 601-606 and 607-612 are depicted as sequential in FIG. 6, the message sequences 601-606 and 607-612 can be performed in a different order or concurrently in some embodiments.

The parent TAS transmits a message 613 to inform the parent device that an active call exists on the mobile child. Some embodiments of the message 613 are a NOTIFY message that includes the information indicating that the active call exists on the mobile child device. In response to receiving the message 613, the parent device responds by transmitting a message 614 to the parent TAS. The parent TAS also transmits a message 615 to inform the non-mobile child device that an active call exists on the mobile child. Some embodiments of the message 615 are a NOTIFY message that includes the information indicating that the active call exists on the mobile child device. In response to receiving the message 615, the non-mobile child device responds by transmitting a message 616 to the parent TAS. Although the message sequences 613, 614 and 615, 616 are depicted as sequential and FIG. 6, the message sequences 613, 614 and 615, 616 can be performed in a different order or concurrently in some embodiments.

Figure 7:
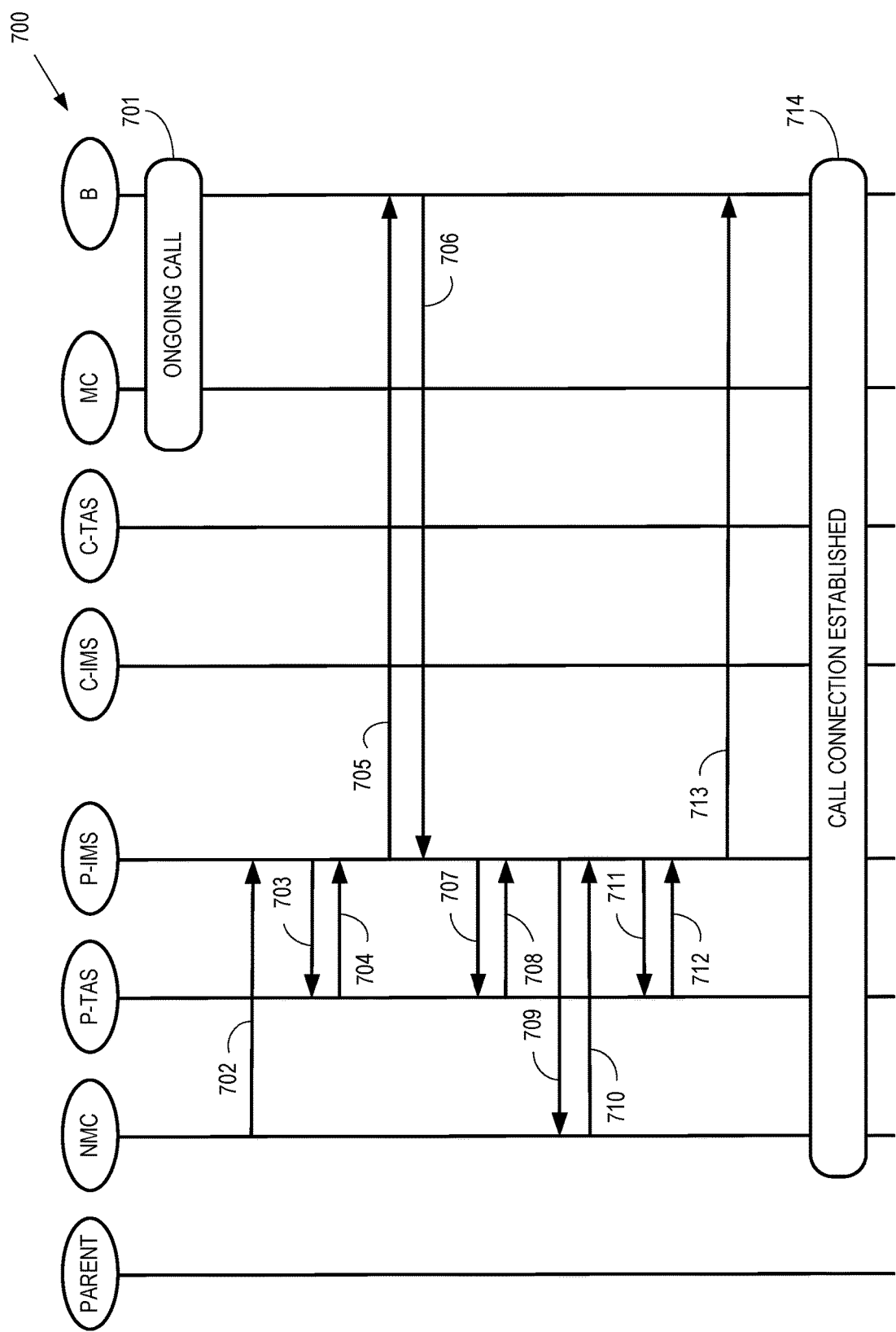
FIG. 7 is a diagram of a first portion of a message flow that illustrates messages exchanged between entities to allow a non-mobile child device to pull an existing call from a mobile child device according to some embodiments.

FIG. 7 is a diagram of a first portion 700 of a message flow that illustrates messages exchanged between entities to allow a non-mobile child device to pull an existing call from a mobile child device according to some embodiments. The first portion 700 of the message flow is implemented in some embodiments of the wireless communication system 100 shown in FIG. 1. Messages can therefore be exchanged between a parent device (PARENT) such as the parent device 101, a non-mobile child device (NMC) such as the non-mobile child device 102, a parent TAS (P-TAS) such as the parent TAS 110, a parent IMS network (P-IMS) such as the parent IMS network 115, a child IMS network (C-IMS) such as the child IMS networks 125, 130, a child TAS (C-TAS) such as the child TASs 135, 140, a mobile child device (MC) such as the mobile child devices 103, 104, and a third party (B) such as the user equipment 105.

At block 701, an ongoing call is taking place between the mobile child device and the third party. The ongoing call can be initiated by the mobile child device according to some embodiments of the message flows 200, 300 shown in FIGS. 2 and 3 or the ongoing call can be initiated by the third party according to some embodiments of the message flows 400, 500, 600 shown in FIGS. 4-6.

The non-mobile child device invokes the call pulling procedure by transmitting a message 702 to the parent IMS network, which transmits a message 703 to the parent TAS. Some embodiments of the messages 702, 703 INVITE messages addressed to the parent phone number. The INVITE messages 702, 703 include an identifier of the ongoing call and information indicating the request to pull the ongoing call from the mobile child device to the non-mobile child device. For example, the INVITE messages 702, 703 can include an asserted identity of the non-mobile child device and a header that indicates replacement of the ongoing call between the parent device and the third party.

The parent TAS recognizes the request in the message 703 and, in response to receiving the message 703, transmits a re-invite message 704 to the parent IMS network, which transmits a re-invite message 705 to the third party. Some embodiments of the messages 704, 705 are REINVITE messages that include information indicating the call pulling offer from the non-mobile child device. In response to receiving the re-invite message 705, the third party responds with a message 706 accepting the request to pull the ongoing call from the mobile child device to the non-mobile child device. The parent IMS network then transmits a message 707 to the parent TAS, which responds by transmitting a message 708 to the parent IMS network. The parent IMS network then transmits a message 709 to inform the non-mobile child that the request to pull the ongoing call from the mobile child device has been accepted. Some embodiments of the messages 706-709 are 200 OK Answer messages.

The non-mobile child acknowledges receipt of the message 709 by transmitting an acknowledgment message 710 to the parent IMS network, which then transmits an acknowledgment message 711 to the parent TAS. In response to the acknowledgment message 711, the parent TAS transmits an acknowledgment message 712 to the parent IMS network, which transmits an acknowledgment message 713 to the third party. A call connection between the non-mobile child and the third party is then established at block 714.

Figure 8:
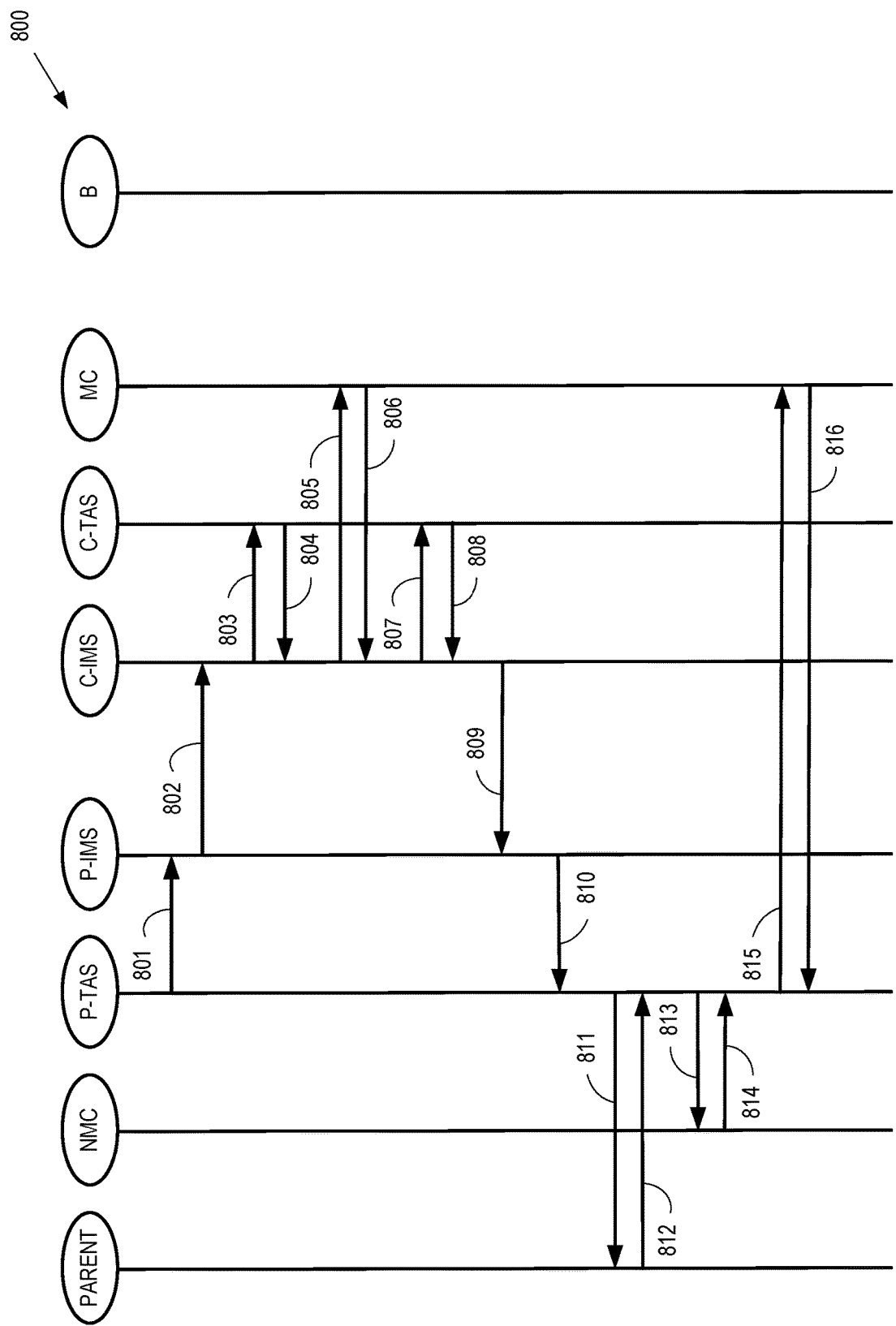
FIG. 8 is a diagram of a second portion of a message flow that illustrates messages exchanged between entities to allow a non-mobile child device to pull an existing call from a mobile child device according to some embodiments.

FIG. 8 is a diagram of a second portion 800 of a message flow that illustrates messages exchanged between entities to allow a non-mobile child device to pull an existing call from a mobile child device according to some embodiments. The second portion 800 of the message flow is implemented in some embodiments of the wireless communication system 100 shown in FIG. 1.

In response to establishing the connection between the non-mobile child device and the third party, the parent TAS transmits a message 801 to release the connection between the mobile child device and the third party. The message 801 is transmitted to the parent IMS network, which then transmits a message 802 to the child IMS network. In response to receiving the message 802, the child IMS network transmits a message 803 to the child TAS, which responds with a message 804. The child IMS network also sends a message 805 to the mobile child to indicate that the call has been pulled to the non-mobile child device. Some embodiments of the messages 801-805 are BYE messages that include information indicating that the reason for releasing the connection between the mobile child device and the third party is that the call has been pulled to another device.

The mobile child transmits a message 806 to the child IMS network acknowledging receipt of the message 805. The child IMS network transmits a message 807 to the child TAS, which responds with a message 808. The child IMS network also sends a message 809 to the parent IMS network, which transmits a message 810 to the parent TAS in response to receiving the message 809. Some embodiments of the messages 806-810 are 200 OK BYE messages acknowledging that the mobile child has been informed that the call has been pulled to the non-mobile child device.

The parent TAS notifies other devices in response to receiving the acknowledgment message 809 indicating that the mobile child has been informed that the call has been pulled. The parent TAS transmits a notify message 811 to the parent phone, which responds with an acknowledgment message 812. The parent TAS transmits a notify message 813 to the non-mobile child device, which responds with an acknowledgment message 814. The parent TAS transmits a notify message 815 to the mobile child device, which responds with an acknowledgment message 816. Some embodiments of the notify messages 811, 813, 815 include information indicating that an active call exists on the non-mobile child device and the mobile child device is idle.

Figure 9:
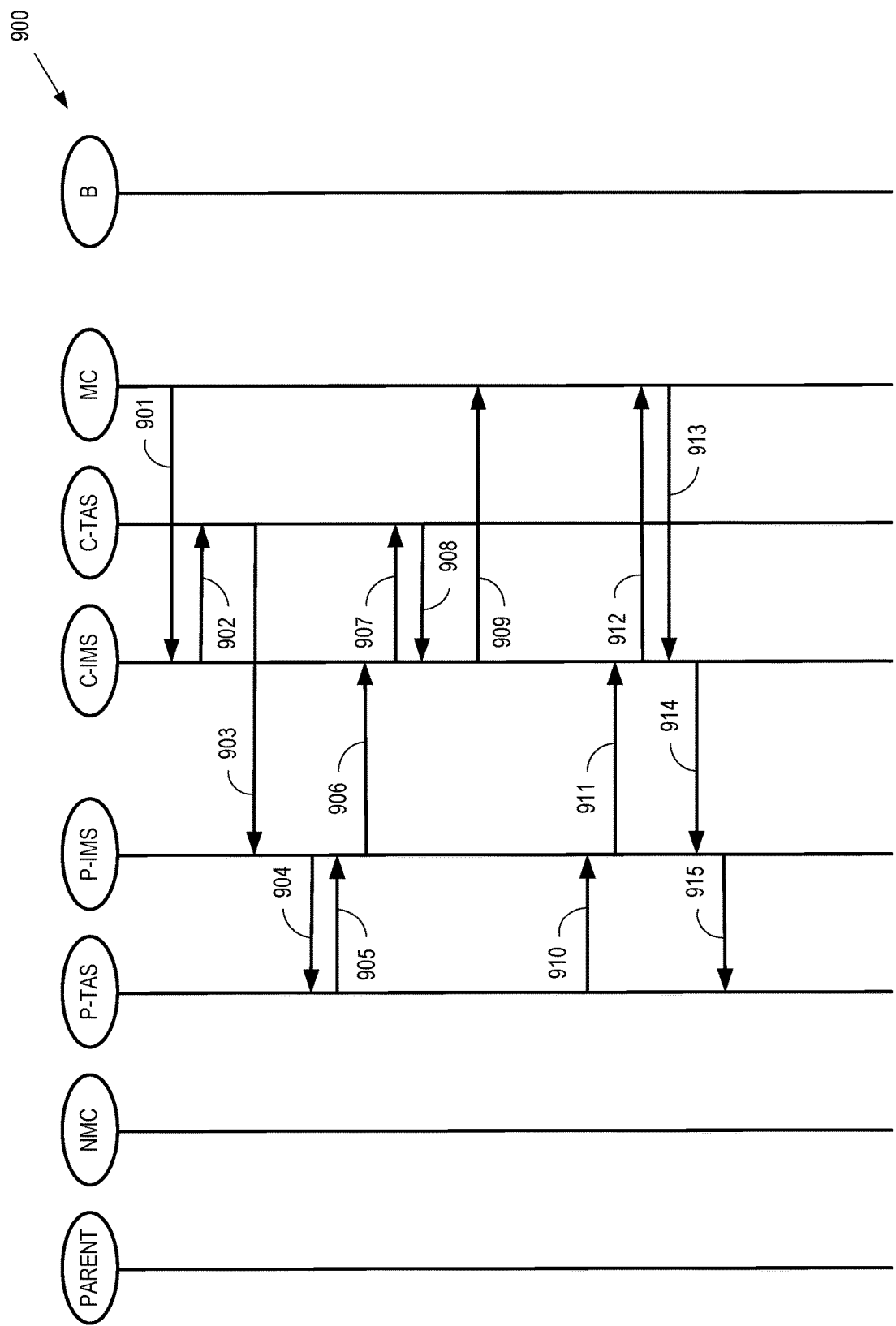
FIG. 9 is a diagram of a first portion of a message flow that illustrates messages exchanged between entities to allow a mobile child device to pull an existing call from a parent device according to some embodiments.

FIG. 9 is a diagram of a first portion 900 of a message flow that illustrates messages exchanged between entities to allow a mobile child device to pull an existing call from a parent device according to some embodiments. The first portion 900 of the message flow is implemented in some embodiments of the wireless communication system 100 shown in FIG. 1. Messages can therefore be exchanged between a parent device (PARENT) such as the parent device 101, a non-mobile child device (NMC) such as the non-mobile child device 102, a parent TAS (P-TAS) such as the parent TAS 110, a parent IMS network (P-IMS) such as the parent IMS network 115, a child IMS network (C-IMS) such as the child IMS networks 125, 130, a child TAS (C-TAS) such as the child TASs 135, 140, a mobile child device (MC) such as the mobile child devices 103, 104, and a third party (B) such as the user equipment 105.

The mobile child device is not required to know the parent phone number. After the mobile child is attached to the child IMS network, the mobile child device transmits a message 901 to the child IMS network to initiate registration of the mobile child device with the parent device. The child IMS network transmits a message 902 to the child TAS. Some embodiments of the messages 901, 902 are SUBSCRIBE messages that include information indicating a native identity of the mobile child device such as a uniform resource identifier (URI) assigned to the mobile child device.

The child TAS stores information indicating that the mobile child device is a child device for an account associated with a parent device. For example, the mobile child device can be a child device for a voice-over-Long Term Evolution (VoLTE) account that is registered on the parent TAS. The child TAS transmits a message 903 to the parent IMS network, which transmits a message 904 to the parent TAS. Some embodiments of the messages 903, 904 are SUBSCRIBE messages that include information identifying the parent account, e.g., a VoLTE number for the parent device.

The parent TAS transmits a message 905 to the parent IMS network in response to receiving the message 904. The parent IMS network transmits a message 906 the child IMS network, which then transmits a message 907 to the child TAS. In response to receiving the message 907, the child TAS transmits a message 908 to the child IMS network, which then transmits a message 909 to the mobile child device. Some embodiments of the messages 905-909 are 200 OK SUBSCRIBE messages.

The parent TAS transmits a notify message 910 to the parent IMS to notify the mobile child device of the current status of the devices that are subscribed to the parent account, which in this case is "all devices idle." The parent IMS network transmits a notify message 911 to the child IMS network. In the illustrated embodiment, the child TAS has not included itself in the record-route or contact headers of the messages used to establish the subscription between the mobile child device and the parent TAS, so the child IMS transmits a notify message 912 directly to the mobile child without sending the notify through the child TAS. The mobile child device responds to the message 912 by transmitting a message 913 to the child IMS network, which then transmits a message 914 to the parent IMS network. In response to receiving the message 914, the parent IMS network transmits a message 915 to the parent TAS. Some embodiments of the messages 910-912 are SIP NOTIFY messages. Some embodiments of the messages 913-915 are 200 OK NOTIFY messages. At this point the mobile child device is registered with the parent account and is able to place, receive, or pull calls on the basis of the parent phone number, as discussed herein.

In some embodiments, the mobile child device is roaming (e.g., in a 3G network) while it is served by the child TAS. In that case, the mobile child device is not able to send messages (such as SUBSCRIBE messages) to the parent TAS or receive messages (such as NOTIFY messages) from the parent TAS. The roaming mobile child device is still able to make and receive calls using the parent phone number. Call pulling can be implemented using special digit strings that are dialed by the user to initiate pulling the call to or from the roaming mobile child device.

Figure 10:
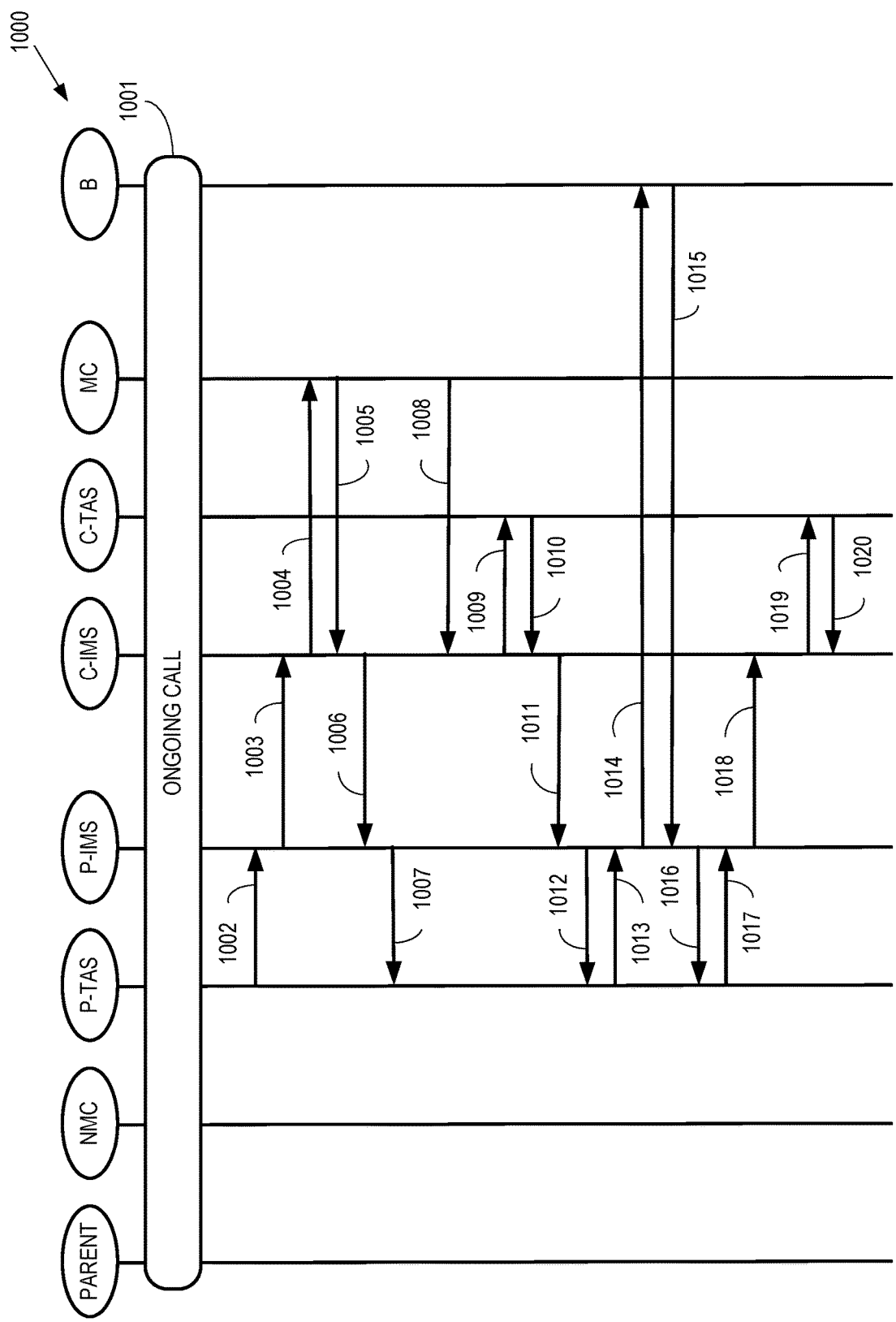
FIG. 10 is a diagram of a second portion of a message flow that illustrates messages exchanged between entities to allow a mobile child device to pull an existing call from a parent device according to some embodiments

FIG. 10 is a diagram of a second portion 1000 of a message flow that illustrates messages exchanged between entities to allow a mobile child device to pull an existing call from a parent device according to some embodiments. The second portion 1000 of the message flow is implemented in some embodiments of the wireless communication system 100 shown in FIG. 1.

At block 1001, the parent device and the third party are engaged in an ongoing call. The parent TAS transmits a message 1002 to the parent IMS network to notify the mobile child device that the parent phone has an active, ongoing call with the third party. The parent IMS network sends a notify message 1003 to the child IMS network, which then sends a notify message 1004 to notify the mobile child device that the parent device has an ongoing call with the third party. In response to receiving the notify message 1004, the mobile child device transmits a message 1005 to the child IMS network, which then sends a message 1006 to the parent IMS network. In response to receiving the message 1006, the parent IMS network transmits a message 1007 to the parent TAS. Some embodiments of the messages 1002-1004 are SIP NOTIFY messages. Some embodiments of the messages 1005-1007 are 200 OK NOTIFY messages.

The mobile child device transmits a message 1008 to the child IMS network to initiate pulling the call from the parent device to the mobile child device. The child IMS network transmits a message 1009 to the child TAS in response to receiving the message 1008. Some embodiments of the messages 1008, 1009 are INVITE messages addressed to the parent phone number that include information indicating a request to replace the parent device with the mobile child device, i.e., a request to pull the call from the parent device to the mobile child device.

The child TAS then transmits a message 1010 to the child IMS network to indicate that the mobile child device is asking to pull the call from the parent device. The child IMS network transmits a message 1011 to the parent IMS network, which then transmits a message 1012 to the parent TAS. Some embodiments of the messages 1010-1012 are INVITE messages addressed to the parent phone number (e.g., the VoLTE number of the parent device). The INVITE messages include information identifying the ongoing call between the parent device and the third party, an asserted identity of the mobile child device, and a called number of the parent device.

The parent TAS interprets the message 1012 as a request from the mobile child device to pull the call. For example, reception of an INVITE message that includes an asserted identity of the mobile child device and a header that indicates replacement of the ongoing call between the parent device and the third party causes the parent TAS to recognize a request to pull the ongoing call to the mobile child device. The parent TAS therefore sends a message 1013 to the parent IMS network to re-invite the third party to the ongoing call with the mobile child device. The parent IMS network transmits a re-invite message 1014 to the third party, which responds with an acceptance message 1015. The parent IMS network then sends an acceptance message 1016 to the parent TAS, which responds with an acknowledgment message 1017. The parent IMS network transmits an acknowledgment message 1018 to the child IMS network, which transmits an acknowledgment message 1019 to the child TAS. In response to receiving the acknowledgment message 1019, the child TAS transmits an acknowledgment message 1020 to the child IMS network. Some embodiments of the messages 1013-1014 are SIP REINVITE requests. Some embodiments of the messages 1015-1016 are SIP 200 OK REINVITE responses. Some embodiments of the messages 1017-1020 are SIP ACK messages.

Figure 11:
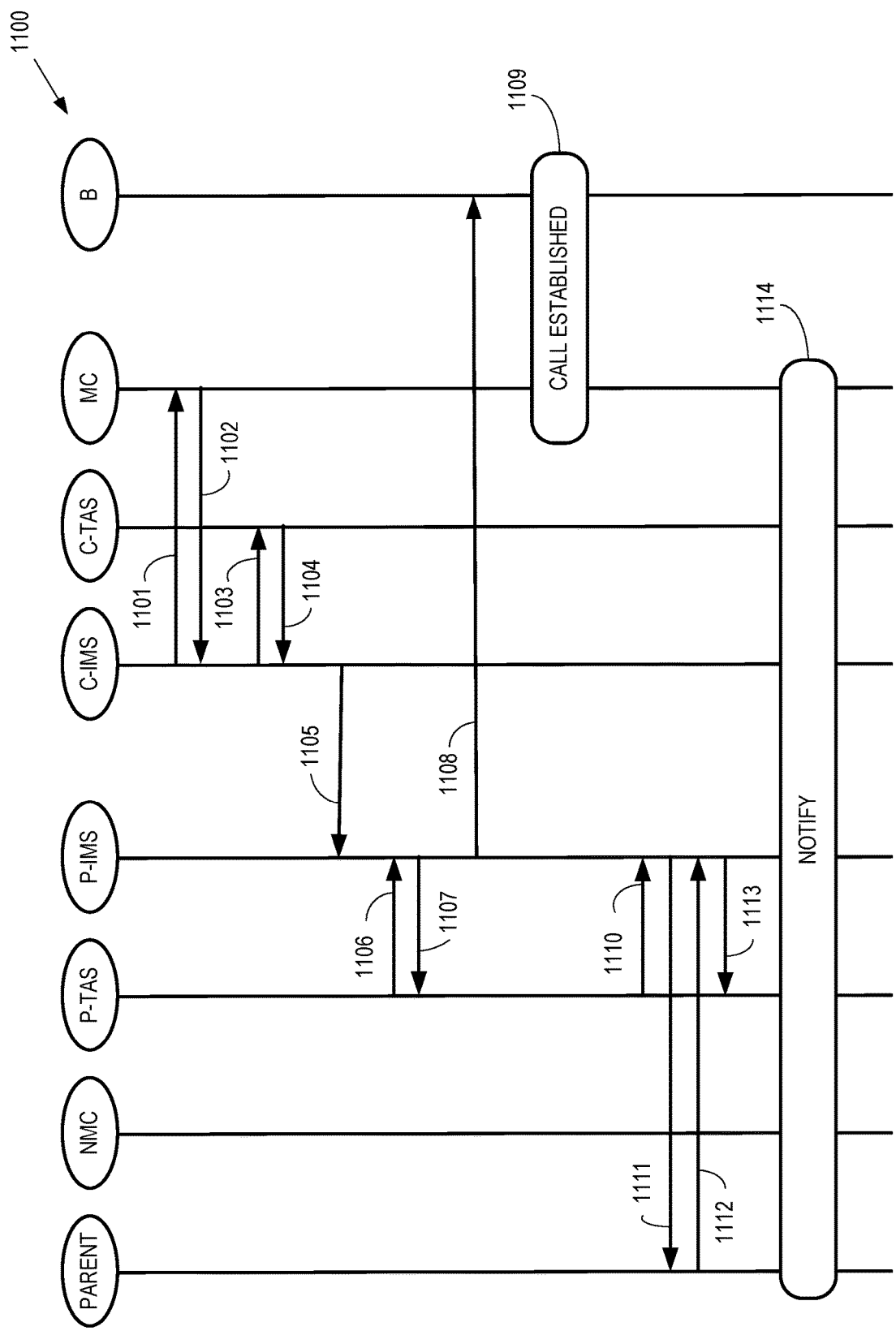
FIG. 11 is a diagram of a third portion of a message flow that illustrates messages exchanged between entities to allow a mobile child device to pull an existing call from a parent device according to some embodiments.

FIG. 11 is a diagram of a third portion 1100 of a message flow that illustrates messages exchanged between entities to allow a mobile child device to pull an existing call from a parent device according to some embodiments. The third portion 1100 of the message flow is implemented in some embodiments of the wireless communication system 100 shown in FIG. 1.

In response to receiving the message 1020 shown in FIG. 10, the child IMS network transmits a message 1101 to inform the mobile child device that the request to pull the ongoing call from the parent device has been accepted. The mobile child device transmits a message 1102 to the child IMS network to acknowledge receipt of the message 1101. The child IMS network then transmits an acknowledgment message 1103 to the child TAS, which responds with an acknowledgment message 1104. The child IMS network then transmits an acknowledgment message 1105 to the parent IMS network, which transmits an acknowledgment message 1106 to the parent TAS. In response to receiving the acknowledgment message 1106, the parent TAS responds by sending an acknowledgment message 1107 to the parent IMS network, which then transmits an acknowledgment message 1108 to notify the third party that the ongoing call has been pulled to the mobile child device. The ongoing call between the mobile child device and the third party is then established at block 1109.

In response to establishing the call at block 1109, the parent TAS transmits a message 1110 to the parent IMS network, which then transmits a message 1111 to inform the parent device that the ongoing call has been released from the parent device. Some embodiments of the messages 1110, 1111 are BYE messages that indicate the reason for releasing the call is that the call has been pulled to another device. The parent device transmits an acknowledgment message 1112 to the parent IMS network, which then transmits an acknowledgment message 1113 to the parent TAS. At block 1114, the parent TAS notifies other devices (including the parent device, the non-mobile child device, and the mobile child device) in response to the mobile child device successfully pulling the call from the parent device and establishing the call at block 1109. The notification messages transmitted to the devices in block 1114 include information indicating that an active call exists on the mobile child device and the parent device is idle.

Figure 12:
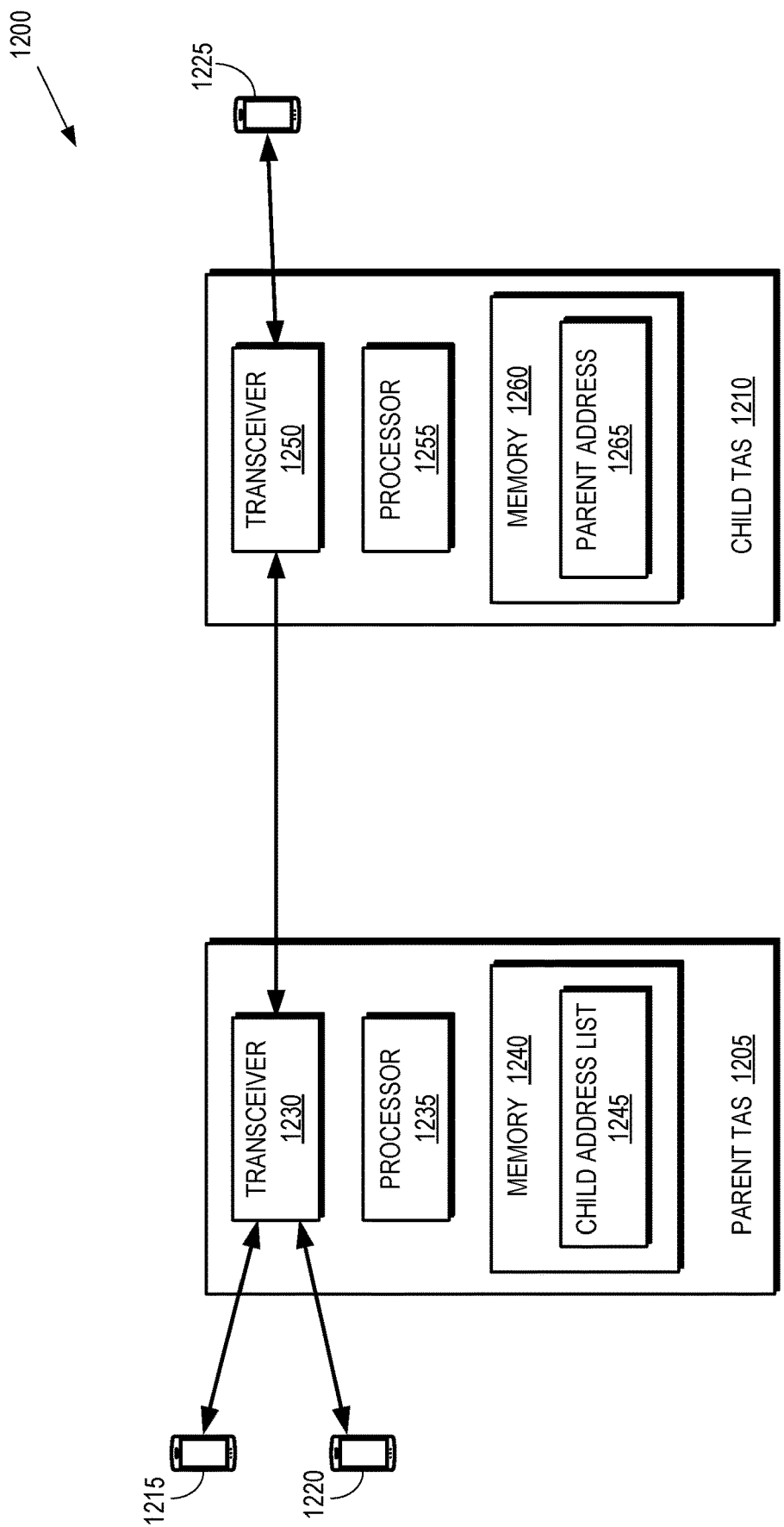
FIG. 12 is a block diagram of a wireless communication system that supports routing of calls associated with a child TAS through a parent TAS according to some embodiments.

FIG. 12 is a block diagram of a wireless communication system 1200 that supports routing of calls associated with a child TAS through a parent TAS according to some embodiments. The wireless communication system 1200 includes a parent TAS 1205 and a child TAS 1210. User equipment 1215, 1220 are registered with parent TAS 1205. In some embodiments, the user equipment 1215 is a parent device and the user equipment 1220 is a non-mobile child device. User equipment 1225 is registered with the child TAS 1205. Some embodiments of the user equipment 1225 are mobile child devices.

The parent TAS 1205 includes a transceiver 1230 for transmitting and receiving signals such as signals exchanged with the user equipment 1215, 1220. The transceiver 1230 can be implemented as a single integrated circuit (e.g., using a single ASIC or FPGA) or as a system-on-a-chip (SOC) that includes different modules for implementing the functionality of the transceiver 1230. The parent TAS 1205 also includes a processor 1235 and a memory 1240. The processor 1235 can be used to execute instructions stored in the memory 1240 and to store information in the memory 1240 such as the results of the executed instructions. Some embodiments of the memory 1240 are able to store a child address list 1245 that includes information identifying non-mobile child devices such as the user equipment 1220 and mobile child devices such as the user equipment 1225 that are registered with the parent TAS 1205. The parent TAS 1205 is therefore able to perform some embodiments of the message flows illustrated in FIGS. 2-11.

The child TAS 1210 includes a transceiver 1250 for transmitting and receiving signals such as signals exchanged with the user equipment 1225. The transceiver 1250 can be implemented as a single integrated circuit (e.g., using a single ASIC or FPGA) or as a system-on-a-chip (SOC) that includes different modules for implementing the functionality of the transceiver 1250. The child TAS 1210 also includes a processor 1255 and a memory 1260. The processor 1255 can be used to execute instructions stored in the memory 1260 and to store information in the memory 1260 such as the results of the executed instructions. Some embodiments of the memory 1260 are able to store a parent address 1265 that includes information identifying parent device 1215 associated with the mobile child device 1225. The child TAS 1210 is therefore able to perform some embodiments of the message flows illustrated in FIGS. 2-11.

In some embodiments, certain aspects of the techniques described above are implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium can be in source code, assembly language code, object code, or other instruction format that is interpreted or otherwise executable by one or more processors.

A computer readable storage medium can include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium can be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter can be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above can be altered or modified and all such variations are considered within the scope of the disclosed subject matter. Accordingly, the protection sought herein is as set forth in the claims below.

What is claimed is:

1. A method comprising:
   receiving, at a parent telephony application server (TAS) allocated to a parent device, a first invite message including a parent device identifier assigned to the parent device, the first invite message referring to at least one of an incoming call involving a calling party device associated with a calling party or an outgoing call involving a called party device associated with a called party; and
   routing, through the parent TAS, the at least one of the incoming call or the outgoing call between the parent TAS and a child TAS allocated to a child device, wherein a subscriber has a multi-device subscription that allows the subscriber to place calls involving the called party device or receive calls involving the calling party device using the parent device and the child device.

2. The method of claim 1, wherein the child device is a mobile child device and a child device identifier is assigned to the mobile child device.

3. The method of claim 2, wherein the parent TAS stores the child device identifier and the child TAS stores the parent device identifier.

4. The method of claim 3, wherein receiving the first invite message comprises receiving an invite message referring to an incoming call to the parent TAS, and further comprising:
   sending a second invite message including the parent device identifier from the parent TAS to the parent device and a third invite message including the child device identifier to the child TAS in response to the parent TAS receiving the first invite message.

5. The method of claim 4, further comprising:
   transmitting at least one cancel message to at least one of the parent device, the mobile child device, or any other child devices associated with the parent device in response to the incoming call being answered by one of the parent device or the mobile child device.

6. The method of claim 3, wherein receiving the first invite message comprises receiving an invite message referring to an outgoing call from the mobile child device to the called party, and the method further comprising:
   receiving, at the parent TAS, a fourth invite message including the parent device identifier from the child TAS, wherein an asserted identity in the fourth invite message indicates the child device identifier; and
   transmitting, from the parent TAS towards the called party, a fifth invite message including a device identifier of the called party, wherein the asserted identity in the fifth invite message indicates the parent device identifier.

7. The method of claim 6, further comprising:
   transmitting at least one notify message to the parent device and any other child devices associated with the parent device in response to the called party answering the outgoing call from the mobile child device.

8. The method of claim 1, further comprising:
   applying, at the parent TAS, at least one call service to the at least one of the incoming call or the outgoing call.

9. The method of claim 1, further comprising:
   establishing the at least one of the incoming call or the outgoing call with at least one of the parent device or the child device; and
   pulling or pushing the at least one of the incoming call or the outgoing call from the at least one of the parent device or the child device to another one of the at least one of the parent device or the child device.

10. The method of claim 2, wherein the child device is registered with an Internet Protocol multimedia subsystem (IMS) network using a unique identifier that is associated with the child device identifier.

11. The method of claim 1, wherein the child device is served by the child TAS in an IMS network while the child device is roaming in another network.

12. A parent telephony application server (TAS) comprising:
a transceiver configured to receive a first invite message including a parent device identifier assigned to a parent device, the first invite message referring to at least one of an incoming call involving a calling party device associated with a calling party or an outgoing call involving a called party device associated with a called party; and
a processor configured to:
generate a second invite message including a called party device identifier in response to receiving the first invite message from a child TAS assigned to a child device; and
generate a third invite message including a child device identifier of the child device in response to receiving the first invite message from the called party device identifier, wherein a subscriber has a multi-device subscription that allows the subscriber to place calls involving the called party device or receive calls involving the calling party device using the parent device and the child device.

13. The parent TAS of claim 12, wherein the child device is a mobile child device that is registered with an Internet Protocol (IP) multimedia subsystem (IMS) network using a unique identifier that is associated with the child device identifier assigned to the mobile child device or the mobile child device is served by the child TAS while the child device is roaming in another network.

14. The parent TAS of claim 13, further comprising:
a memory to store the child device identifier and device identifiers of any other child devices associated with the parent device.

15. The parent TAS of claim 14, wherein the transceiver is configured to send the second invite message including the parent device identifier to the parent device and the third invite message including the child device identifier to the child TAS in response to receiving the first invite message.

16. The parent TAS of claim 15, wherein the transceiver is configured to transmit at least one cancel message to at least one of the parent device, the mobile child device, or any other child devices associated with the parent device in response to the incoming call being answered by one of the parent device or the mobile child device.

17. The parent TAS of claim 13, wherein the transceiver is configured to:
receive a fourth invite message including the parent device identifier from the child TAS, wherein an asserted identity in the fourth invite message indicates the child device identifier; and
transmit, towards the called party indicated by the called party device identifier, a fifth invite message including a device identifier of the called party, wherein the asserted identity in the fifth invite message indicates the parent device identifier.

18. The parent TAS of claim 17, wherein the transceiver is configured to transmit at least one notify message to the parent device and any other child devices associated with the parent device in response to the called party answering the outgoing call from the mobile child device.

19. The parent TAS of claim 12, wherein the processor is configured to apply at least one call service to the at least one of the incoming call or the outgoing call.

20. The parent TAS of claim 12, wherein the transceiver is configured to transmit at least one re-invite message in response to receiving a request to pull or push a call from at least one of the parent device or the child device to another one of the at least one of the parent device or the child device.

21. A child telephony application server (TAS) comprising:
a transceiver configured to transmit a subscribe message to a parent TAS, wherein the subscribe message includes an identifier of a child device; and
a processor configured to:
initiate an outgoing call involving a called device associated with a called party by generating a first invite message including a parent device identifier of a parent device associated with the parent TAS and a called party device identifier; and
generate a second invite message including a child device identifier of the child device in response to receiving a third invite message generated by the parent TAS in response to an invite message generated by a calling party device associated with a calling party, wherein a subscriber has a multi-device subscription that allows the subscriber to place calls involving the called party device or receive calls involving the calling party device using the parent device and the child device.

22. The child TAS of claim 21, wherein the transceiver is configured to transmit a request to pull a call from at least one of the parent device or another child device.

* * * * *